(12) United States Patent
Cai et al.

(10) Patent No.: US 11,207,748 B2
(45) Date of Patent: Dec. 28, 2021

(54) SOLDER PREFORM

(71) Applicant: SOLDERWELL ADVANCED MATERIALS CO., LTD., Guangdong (CN)

(72) Inventors: Hangwei Cai, Guangdong (CN); Kun Du, Guangdong (CN); Liesong Cai, Guangdong (CN); Minghan Chen, Guangdong (CN)

( * ) Notice: Subject to any disclaimer, the term of this patent is extended or adjusted under 35 U.S.C. 154(b) by 0 days.

(21) Appl. No.: 16/978,197

(22) PCT Filed: Sep. 6, 2018

(86) PCT No.: PCT/CN2018/104382
§ 371 (c)(1),
(2) Date: Sep. 4, 2020

(87) PCT Pub. No.: WO2019/227756
PCT Pub. Date: Dec. 5, 2019

(65) Prior Publication Data
US 2021/0039206 A1    Feb. 11, 2021

(30) Foreign Application Priority Data

Jun. 1, 2018  (CN) .......................... 201810556267.7
Jun. 1, 2018  (CN) .......................... 201820842281.9

(51) Int. Cl.
B23K 35/02         (2006.01)

(52) U.S. Cl.
CPC ... *B23K 35/0238* (2013.01); *Y10T 428/12396* (2015.01)

(58) Field of Classification Search
None
See application file for complete search history.

(56) References Cited

U.S. PATENT DOCUMENTS

| 4,705,205 A | * | 11/1987 | Allen | ................. | H05K 13/0465 |
| | | | | | 228/180.22 |
| 9,425,517 B2 | * | 8/2016 | Schlarb | ................. | B23K 35/362 |
| 2011/0186617 A1 | | 8/2011 | Hartnett et al. | | |
| 2014/0206149 A1 | | 7/2014 | Liu et al. | | |

FOREIGN PATENT DOCUMENTS

| CN | 202726328 U | 2/2013 |
| CN | 202984929 U | 6/2013 |
| CN | 103347644 A | 10/2013 |
| CN | 104625461 A | 5/2015 |
| CN | 205290109 U | 6/2016 |
| CN | 207139126 U | 3/2018 |

OTHER PUBLICATIONS

International search report of PCT/CN2018/104382.

* cited by examiner

*Primary Examiner* — Daniel J. Schleis (57) ABSTRACT

A solder preform is provided, at least one surface of the solder preform (C) is provided with a plurality of protruding portions and/or recessing portions provided at a certain interval.

8 Claims, 9 Drawing Sheets

Front surface      Rear surface

FIG. 8a

Front surface      Rear surface

FIG. 8b

Front surface

Rear surface

FIG. 8c

Front surface

Rear surface

FIG. 8d

Front surface                    Rear surface

FIG. 8e

SOLDER PREFORM

TECHNICAL FIELD

The present invention relates to the technical field of materials for soldering electronic components, in particular to a solder preform.

BACKGROUND

With the increasing precision and integration of electronic components, the requirements for heat dissipation and reliability of the package are becoming higher and higher, and reducing the void rate of the soldered surface after being soldered is the top priority for improving heat dissipation and reliability. If the void rate after being soldered is high, the thermal resistance of the solder joint will increase, the reliability of the solder joint will be poor, the resistance to cold and hot cycles and impact resistance will be poor, and the solder joint is prone to crack or even fracture, which is very likely to cause irreparable losses to components.

The soldering of the solder preform is currently generally performed by flux reduction soldering or formic acid (or hydrogen) reduction soldering. During soldering, the flux or formic acid (or hydrogen) itself, or the flux or formic acid (or hydrogen) will generate gas when reducing the oxide film on the soldered surface and the surface of the solder. When the planar solder preform is packaged and soldered, the gas generated during soldering is closed in the soldering surface because of no escape path, it is inconvenient for, the gas to escape, or even the gas cannot escape, so as to bring about many problems in reducing, the soldering void rate and improving the soldering quality.

SUMMARY

In view of this, it is necessary to provide a solder preform that reduces the soldering void rate and improves the soldering quality in response to the above problems.

The present invention is achieved through the following technical solutions.

A solder preform is provided, wherein at least one surface of the solder preform is provided with a plurality of protruding portions and/or recessing portions provided at a certain interval.

Further, the interval distance is preferably: 0.1-100 mm. The protruding portions and/or recessing portions of the interval prevent the solder preform from completely closing the surface of the material to be soldered at the same time, so that the gas generated in the preheating stage and the soldering stage is discharged with sufficient time and channels, so the interval of the protruding portions and/or recessing portions is not limited to the preferred interval value. All interval values can achieve the function of the solution of the present invention, but the overall effect is optimal within the preferred value range.

Further, the distance between the highest point and the lowest point on the surface of the solder preform is: 0.005-5 mm. The protruding portions and/or recessing portions of the interval prevent the solder preform from completely closing the surface of the material to be soldered at the same time, so that the gas generated in the preheating stage and the soldering stage is discharged with sufficient time and channels so the distance between the highest point and the lowest point on, the surface of the solder preform is not limited to the preferred value. All distance values can achieve the function of the solution of the present invention, but the overall effect is optimal within the preferred value range.

The distance between the highest point and the lowest point and/or the interval distance between the protruding portions and/or recessing portions determine the amount of gas escaping from the gas escaping channel.

Further, the number of the protruding portions or the recessing portions is at least one.

Further, the protruding portion comprises at least one of ribs (the top of the protruding portion is linear, or the contact method with the object to be soldered is line contact), bumps (the top of the protruding portion converges into a point shape, or the contact method with the object to be soldered is point contact) or bosses (the top of the protruding portion is planar, or the contact method of the object to be soldered is surface contact).

Further, the recessing portion comprises a groove (the recessing portion, is opened on the surface of the solder preform and recessed into the body of the solder preform, the bottom of the recess is planar or converges into a line, such as a recess with a cylindrical or square cross-section or a gully-shaped recess with a trapezoidal or V-shaped cross-section, etc.) or a pit (the recessing portion is opened on the surface of the solder preform, and recessed into the body of the solder preform, the bottom of the recess is planar or converges into a point, such as a hemispherical, fan-shaped, square, trapezoid, conical recess, etc.), etc.

Further, the shape, size, interval, arrangement of the protruding portions and/or recessing portions provided on each surface of the solder preform, the height of the protruding portions and/or the depth of the recessing portions may be completely the same, partially the same, or completely different.

Further, when protruding portions and/or recessing portions are provided on both surfaces of the solder preform, the shape, size, interval, arrangement of the protruding portions and/or recessing portions provided on both surfaces, the height of the protruding portions and/or the depth of the recessing portions may be completely the same, partially the same, or completely different. For example, both surfaces may be corrugations (formed in such a way that the protruding portions and recessing portions are combined), pits, bumps, or bosses; or one surface may be corrugations (formed in such a way that the protruding portions and recessing portions are combined), and the other surface may be pits, bumps or bosses; or one surface may be pits or bumps, and the other surface may be bosses. Any combination of protruding portions and/or recessing portions in other specific forms is also possible.

Further, the cross-sections of the protruding portions or recessing portions on the surface of the solder preform may be polygons such as square, rectangle, trapezoid, triangle, etc., or may be U-shaped, fan-shaped and other shapes; the size of the protruding portions or recessing portions has no effect on the function of the solder preform of the present invention, that is, the size is not limited; the arrangement may be regular, uniform and continuous, or irregular, non-uniform and discontinuous.

Further, the protruding portions and/or recessing portions on the surface of the solder preform may be stamped or rolled, or may be, molded by other mechanical (such as the solder preform body and the protruding portions are separately prepared, and then are assembled through a preset slot or hole, etc.) or chemical (such as chemical etching, spraying, etc.) methods.

Further, the alloy material of the solder preform may be any one of tin-based, lead-based, indium-based, bismuth-based, zinc-based, antimony-based, silver-based, copper-based, aluminum-based solder, etc., as the solder preform made of an alloy material, or the solder preform made of at least two kinds of alloy materials and multilayer composites; or a composite solder preform with a metal or non-metal mesh or wire attached inside the solder, or a composite solder preform with metal or non-metal particles contained in a solder matrix.

Further, the solder preform may be a solder preform without flux, or a solder preform containing flux; the way in which the flux exists on the solder preform may be surface coating or the method in which the flux is contained in the solder matrix (that is, the flux is added to the matrix material to manufacture the solder preform together).

Further, the solder preform may be made into a polygonal shape (such as a square shape, a strip shape, etc.), a round shape, an arc shaped, a ring shape, a frame shape, etc.

The beneficial effects of the present invention are as follows.

During the preheating stage, the solder preform of the present invention, facilitates the reducing gas or flux to enter the part to be soldered along the gap formed by the protruding portions and/or recessing portions, thereby more effectively reducing the oxide film of the solder preform and the soldered surface, which is conducive to the escape of the gas generated after the reduction along the gap formed by the protruding portions and/or recessing portions; during the soldering stage, the peak or bump of the solder preform will be preferentially melted due to being in contact with the soldered surface, and will be gradually melted and advanced to a lower, position until the solder is completely melted, which further promotes the escape of the gas, generated during the soldering process, so as to achieve the purpose of reducing the soldering void rate and improving the soldering quality. In the preheating stage and the soldering stage, as long as the effect of escaping gas at at least one stage is achieved, it is sufficient to achieve the effect of reducing the soldering void rate, so the interval of the protruding portions and/or recessing portions is not limited to the preferred distance value. The distance between the highest point and the lowest point on the surface of the solder preform is also not limited to the preferred value.

BRIEF DESCRIPTION OF THE DRAWINGS

To facilitate a clearer understanding of the present invention, refer to the attached schematic diagram. The attached schematic diagram should not be construed as limiting the content of the present invention, but is intended to be illustrative.

FIG. 3 comprises FIGS. 3a, 3b, and 3c, and is a schematic diagram of a kind of solder preform containing a single-surfaced protruding portion (a protruding edge), wherein FIG. 3a is a regular and uniform arrangement; FIG. 3b is a regular and non-uniform arrangement; FIG. 3c is an irregular and non-uniform arrangement; in FIGS. 3a, 3b, and 3c, the figures on the right are cross-sectional diagrams of the figures on the left.

FIG. 5 comprises FIG. 5a, FIG. 5b, FIG. 5c and FIG. 5d, and is a schematic diagram of a solder preform containing concave/convex portions provided on both surfaces, wherein FIG. 5d is a rib provided on both surfaces in an irregular and non-uniform arrangement; in FIGS. 5a, 5b, 5c, and 5d, the figures on the right are cross-sectional diagrams of the figures on the left.

FIG. 8 comprises FIGS. 8a, 8b, 8c, 8d and 8e, and is a kind of solder preform containing protruding portions or recessing portions, in different shape combinations, wherein

DESCRIPTION OF THE EMBODIMENTS

In order to better explain the problems to be solved, the technical solutions adopted and the beneficial effects achieved by the technical solution of the present invention, it will now be further set forth in conjunction with specific embodiments. It is worth noting that the technical solutions of the present invention include but are not limited to the following embodiments.

If no specific technologies or conditions are indicated in the embodiments of the present invention, the technologies or conditions described in the literature in the art or the product specification shall be followed. The reagents or instruments used do not indicate the manufacturer, and are all conventional products that can be obtained through commercial purchases.

Figure 1:
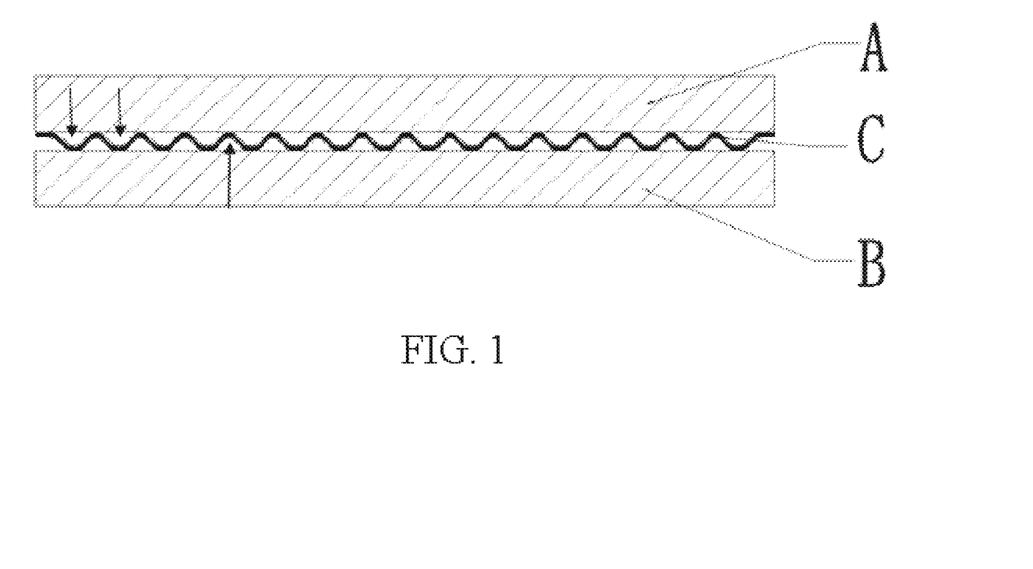
FIG. 1 is a schematic diagram of a soldering part, where A and B are the objects to be soldered, and C is the solder preform of the present invention.
Figure 2:
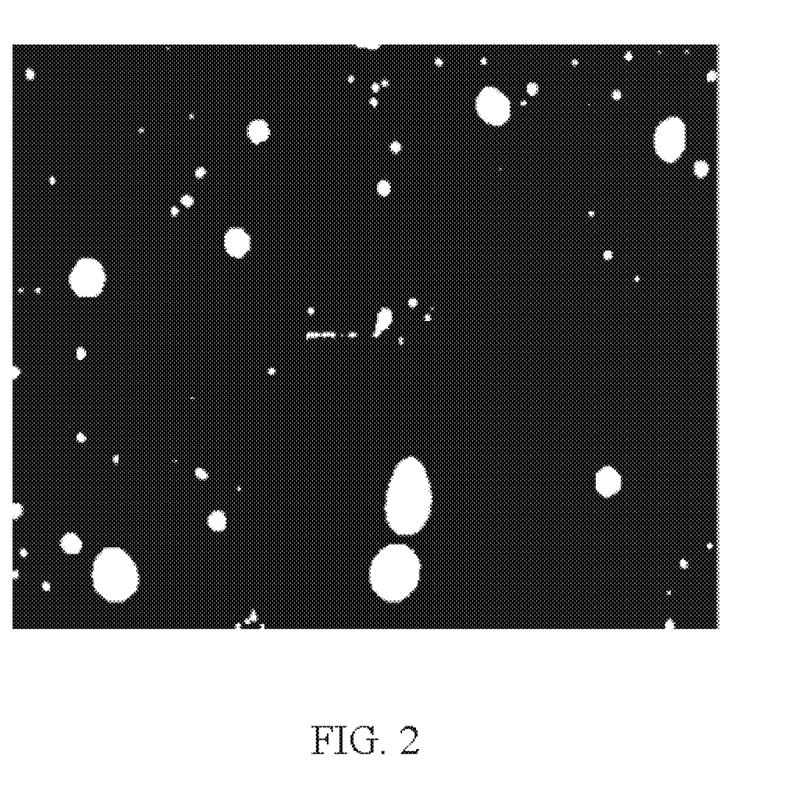
FIG. 2 is a diagram of ultrasonic detection void rate after soldering, where the white part indicates that soldering is void, and the black part indicates that soldering is good.

Refer to FIG. 1, which is a state diagram of the solder preform of the present invention when it is used for soldering, where A and B are the soldered objects, and C is the solder preform of the present invention. There is a time process for the solder preform C to melt. The gas and heat generated in this process can be removed outwards along the channel formed by the solder preform C and the soldered objects A and B (the position shown by the arrows in FIG.

1). After the solder preform C is completely melted, the gas between the soldered objects A and B is almost completely eliminated, reducing the void ratio of the soldered part.

Embodiment 1

Referring to FIG. 3, FIG. 3a, FIG. 3b and FIG. 3c are schematic diagrams (left) and cross-sectional diagrams (right) of a solder preform containing protruding, portions on one surface, that is, corrugations (protruding edges) on one surface.

Figure 3A:
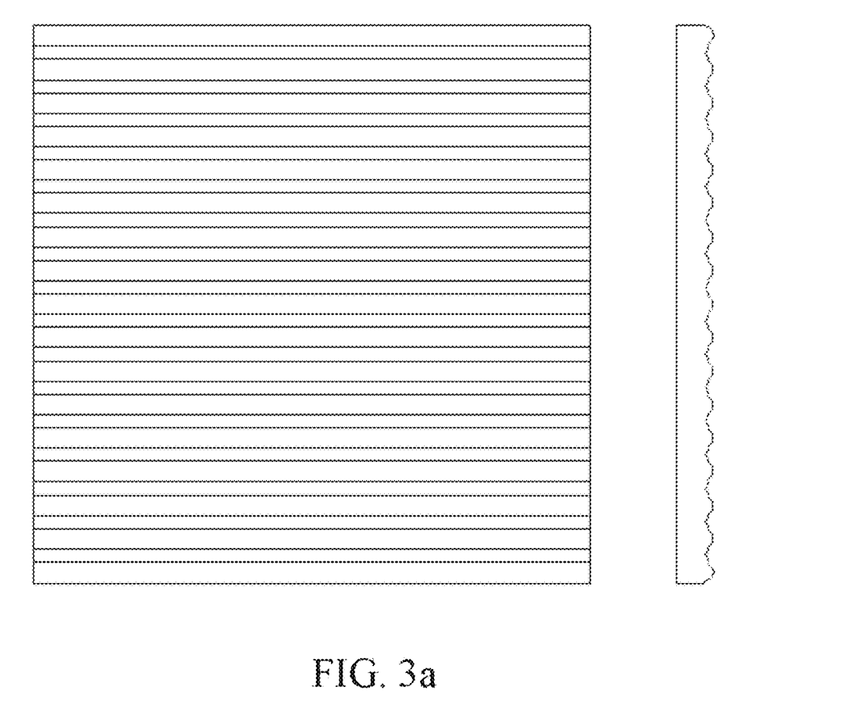
Figure 3B:
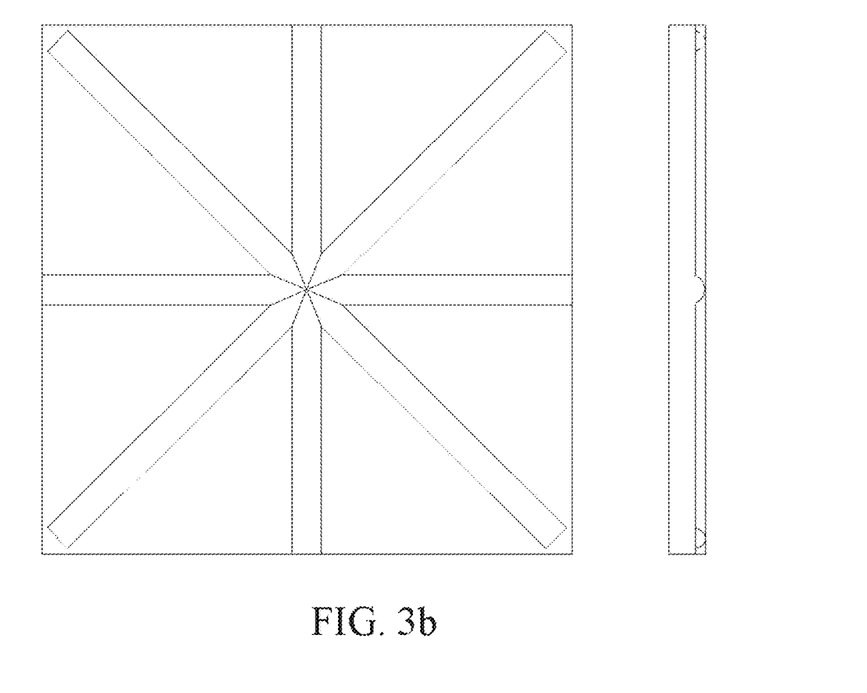
Figure 3C:
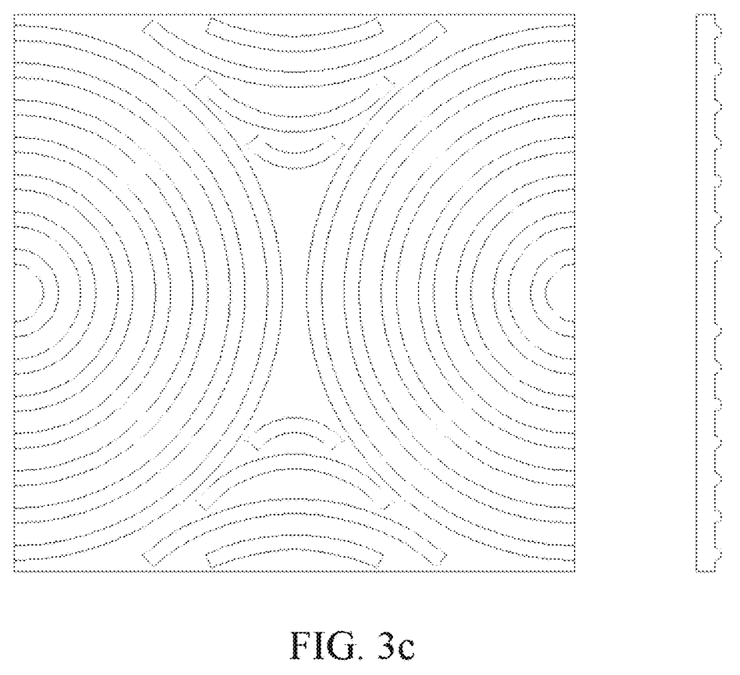

The solder preform of this embodiment is in a sheet shape as a whole, the protruding portions are ribs, the interval between the ribs is 1 mm, and the solder preform is formed by punching with a punch.

The rib cross-section is fan-shaped, the top edge of the rib is the highest point on the surface of the solder preform, the bottom edge is the lowest point on the surface of the solder preform, and the distance between the highest point and the lowest point is 0.09 mm. The ribs are parallel to each other and continuously distributed on the surface of the solder preform.

The alloy material of the solder preform is lead-based solder.

The solder preform is a solder preform coated with flux on the surface.

In some other embodiments, the corrugation formed by the ribs as shown in FIG. 3a may also be formed by grooves or pits; the solder preform may be molded by rolling, or may be molded by other mechanical (such, as the solder preform body and the protruding portions are separately prepared, and then are assembled through a preset slot or hole, etc.) or chemical (such as chemical etching, spraying, etc.) methods. The overall shape of the solder preform can be made into square, round, arc-shaped, ring-shaped, frame-shaped or strip-shaped, etc.

In some other embodiments, the cross-sectional shape of the ribs or grooves may also be square, rectangular, trapezoidal, triangular, U-shaped, etc.

In some other embodiments, the height of the protruding portions and/or the depth of the recessing portions, the interval between the ribs, grooves or pits can be kept at a fixed value, which are regularly and uniformly arranged on the surface of the solder preform. Alternatively, different heights of protruding portions and/or depths of recessing portions, or different interval values (as shown in FIG. 3c) may be selected at the same time, which are even crossed (as shown in FIG. 3b), and irregularly and non-uniformly distributed on the surface of the solder preform.

In some other embodiments, the solder preform may also select any one of tin-based, indium-based, bismuth-based, zinc-based, antimony-based, silver-based, copper-based, aluminum-based solder, etc., as the solder, preform made of an alloy material, or the solder, preform made of alloy materials of any two or more of tin-based, lead-based, indium-based, bismuth-based, zinc-based, antimony-based, silver-based, copper-based, aluminum-based solder, etc., at any ratio of multilayer composites.

In some other embodiments, the internal structure of the solder preform may be a composite solder preform with a metal or non-metal mesh or wire attached inside the solder, or a composite solder preform with metal or non-metal particles contained in the solder matrix.

In some other embodiments, the solder preform may also be a solder preform not coated with flux on the surface, or a solder preform containing flux in the solder matrix.

Embodiment 2

Figure 4:
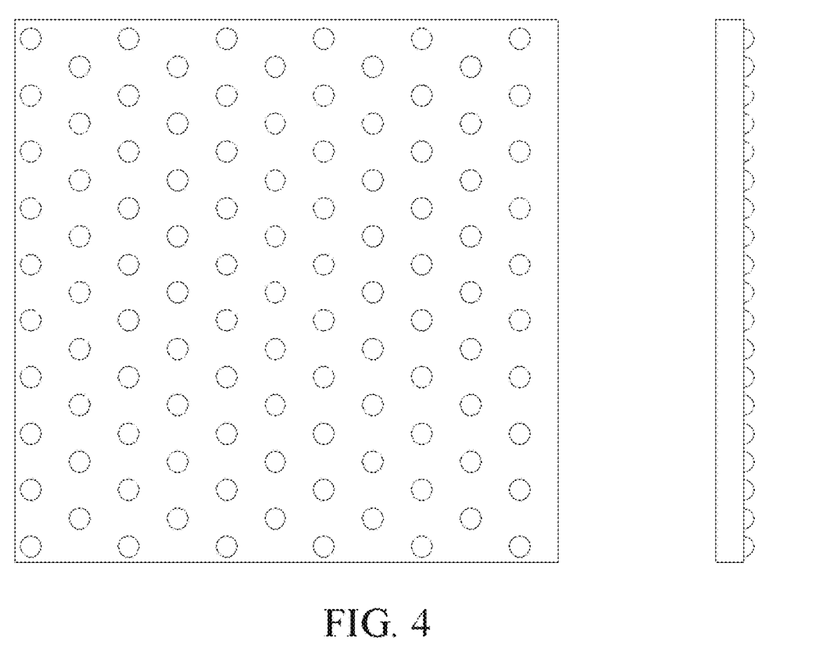
FIG. 4 is a schematic diagram of a solder preform containing a single-surfaced protruding portion (bump).

Referring to FIG. 4, FIG. 4 is a schematic diagram (left) and a cross-sectional diagram (right) of a solder preform containing bumps (protruding portions) on one surface.

The solder preform of this embodiment is in a sheet shape as a whole, the interval between the protruding portions is 1.5 mm, the distance between the highest point and the lowest point on the surface of the solder preform is 0.2 mm, and the solder preform is formed by rolling.

The bumps are all hemispherical, and regularly and uniformly distributed on the surface of the solder preform.

The alloy material of the solder preform is tin-based solder.

The solder preform is a solder preform coated with flux on the surface.

In some other embodiments, the protruding portion may also be a boss (the top away from the solder preform body is a plane); the solder preform may also be formed by punching with a punch, or may be molded by other mechanical (such as the solder preform body and the protruding portion are separately prepared, and then are assembled through a preset slot or hole, etc.) or chemical (such as chemical etching, spraying, etc.) methods. The overall shape of the solder preform can be made into square, round, ring-shaped, frame-shaped or strip-shaped, etc.

In some other embodiments, the top surface of the boss may be square, rectangular, triangular, round, trapezoidal, or the like, etc.

In some other embodiments, the height and/or interval of the bumps or bosses can be kept at a fixed value, which are regularly and uniformly arranged on the surface of the solder preform. Alternatively, different heights and/or interval values may be selected at the same time, which are irregularly and non-uniformly distributed on the surface of the solder preform.

In some other embodiments, the solder preform may also select any one of lead-based, indium-based, bismuth-based, zinc-based, antimony-based, silver-based, copper-based, aluminum-based solder, etc., as the solder preform made of an alloy material, or the solder preform made of alloy materials of any two or more of tin-based, lead-based, indium-based, bismuth-based, zinc-based, antimony-based, silver-based, copper-based, aluminum-based solder, etc., at any ratio of multilayer composites.

In some other embodiments, the internal structure of the solder preform may be a composite solder preform with a metal or non-metal mesh or wire attached inside the solder, or a composite solder preform with metal or non-metal particles contained in the solder matrix.

In some other embodiments, the solder preform may also be a solder preform not coated with flux on the surface, or a kind of solder preform containing flux in the solder matrix.

Embodiment 3

Referring to FIG. 5, FIG. 5a, FIG. 5b, FIG. 5c, and FIG. 5d are schematic diagrams of a solder preform containing protruding portions and/or recessing portions on both surfaces.

Figure 5A:
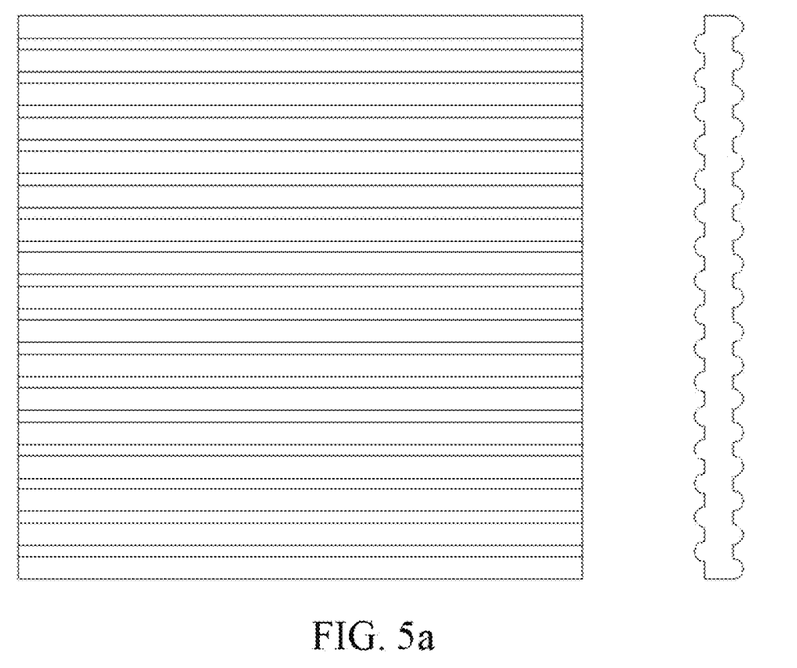
FIG. 5a is a rib provided on both surfaces.
Figure 5B:
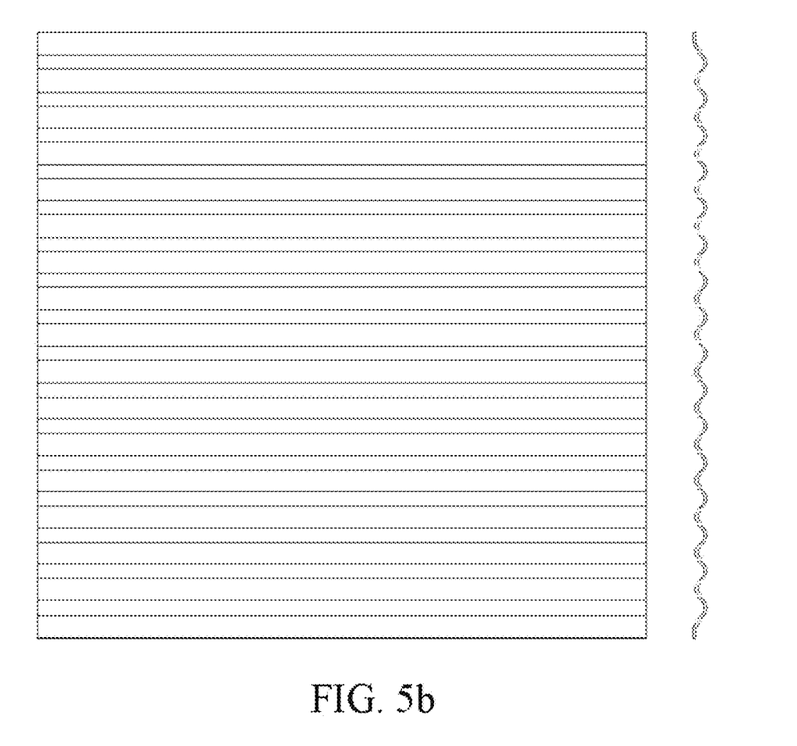
FIG. 5b is a groove and a rib provided on both surfaces at intervals.
Figure 5C:
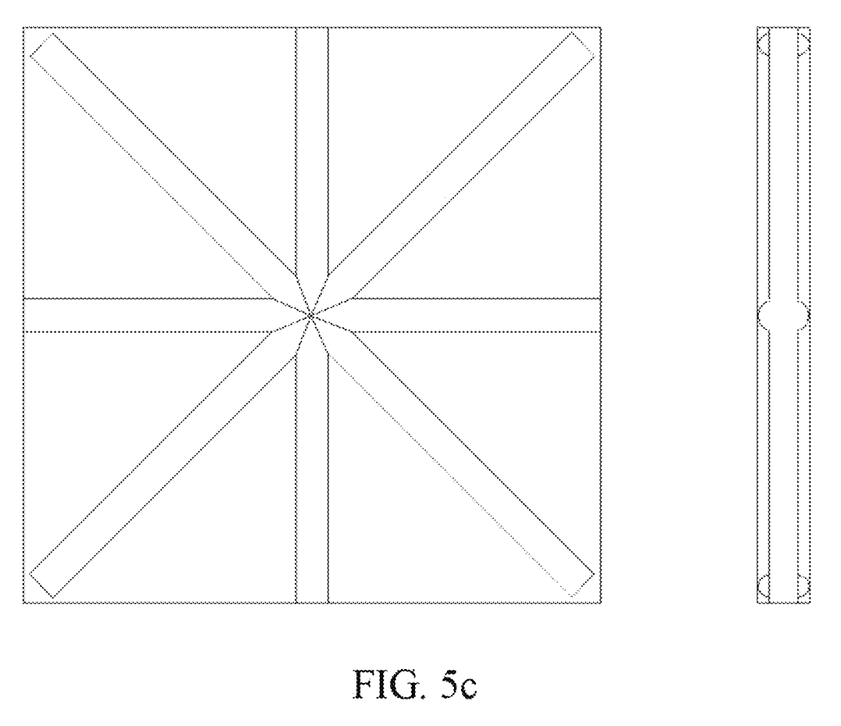
FIG. 5c is a rib provided on both surfaces in a regular and non-uniform arrangement.
Figure 5D:
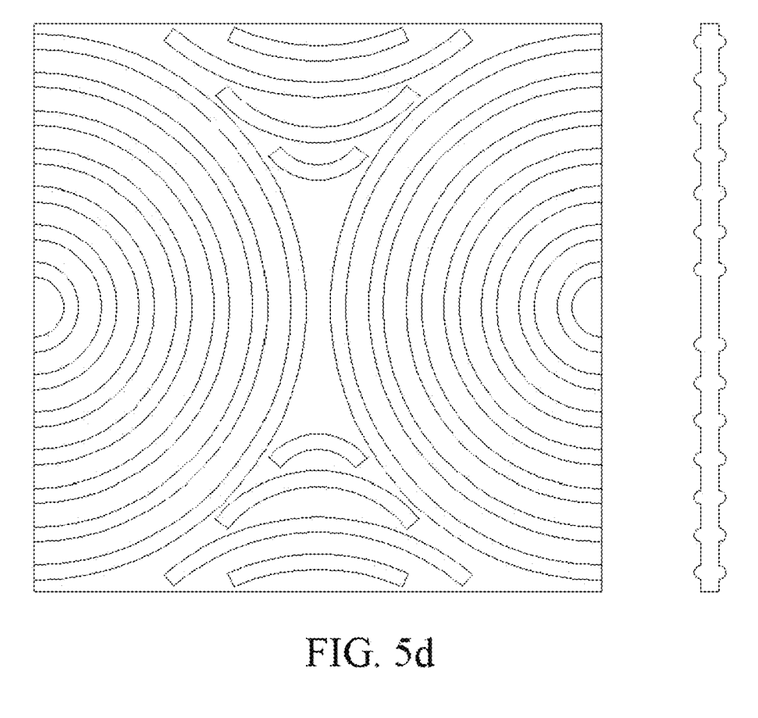

In this embodiment, FIGS. 5a, 5c, and 5d are modifications of Embodiment 1 (FIGS. 3a, 3b, and 3c). The difference is that in this embodiment, protruding portions are provided on both surfaces of the solder preform, and the protruding portions, on both surfaces have the same shape, size, and arrangement.

In some other embodiments, the corrugation formed by the ribs as shown in FIG. 5a may also be formed by grooves or pits; the solder preform may also be molded by rolling, or may be molded by other mechanical (such as the solder preform body and the protruding portion are separately prepared, and then are assembled through a preset slot or hole, etc.) or chemical (such as chemical etching, spraying, etc.) methods. The overall shape of the solder preform can be made into square, round, arc-shaped, ring-shaped, frame-shaped or strip-shaped, etc.

In some other embodiments, the cross-sectional shape of the ribs or grooves may also be square, rectangular, trapezoidal, triangular, U-shaped, etc.

In some other embodiments, the height of the protruding portions and/or the depth of the recessing portions, the interval between the ribs, grooves or pits can be kept at a fixed value, which are regularly and uniformly arranged on the surface of the solder preform. Alternatively, different heights of protruding portions and/or depths of recessing portions or different interval values (as shown in FIG. 5c) may be selected at the same time, which are even crossed (as shown in FIG. 5d), and irregularly and non-uniformly distributed on the surface of the solder preform. Alternatively, the entire solder preform is all made into a wave shape, and this wave shape is formed by the alternate arrangement of grooves and ribs (FIG. 5b).

In some other embodiments, the solder preform may also select any one of tin-based, indium-based, bismuth-based, zinc-based, antimony-based, silver-based, copper-based, aluminum-based solder, etc., as the solder preform made of an alloy material, or the solder preform made of alloy materials of any two or more of tin-based, lead-based, indium-based, bismuth-based, zinc-based, antimony-based, silver-based, copper-based, aluminum-based solder, etc., at any ratio of multilayer composites.

In some other embodiments, the internal structure of the solder preform may be a composite solder preform with a metal or non-metal mesh or wire attached inside the solder, or a composite solder preform with metal or non-metal particles contained in the solder matrix.

In some other embodiments, the solder preform may also be a solder preform not coated with flux on the surface, or a solder preform containing flux in the solder matrix.

Embodiment 4

Figure 6:
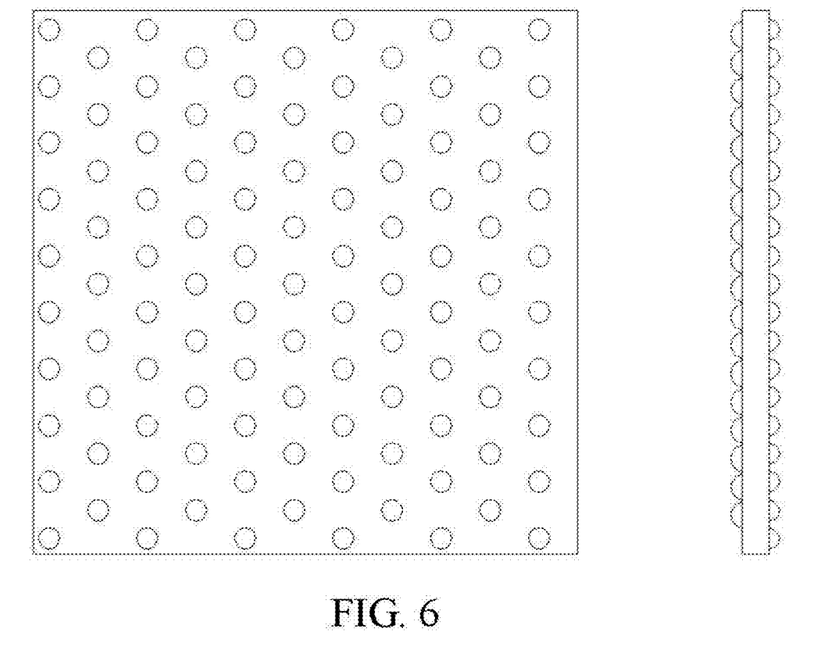
FIG. 6 is a schematic diagram of a solder preform containing double-surfaced protruding portions (different bump sizes on both surfaces).

Referring to FIG. 6, FIG. 6 is a schematic diagram (left) and a cross-sectional diagram (right) of a solder preform containing bumps (protruding portions) on both surfaces.

In this embodiment, FIG. 6 is a modification of FIG. 4 in Embodiment 2. The difference is that in this embodiment, protruding portions are provided on both surfaces of the solder preform, and the protruding portions on both surfaces have the same shape and arrangement and different sizes.

In some other embodiments, the protruding portion may also be a boss (the top away from the solder preform body is a plane); the solder preform may also be formed by punching with a punch, or may be molded by other mechanical (such as the solder preform body and the protruding portion are separately prepared, and then are assembled through a preset slot or hole, etc.) or chemical (such as chemical etching, spraying, etc.) methods. The overall shape of the solder preform can be made into square, round, ring-shaped, frame-shaped or strip-shaped, etc.

In some other embodiments, the top surface of the boss may be square, rectangular, triangular, round, trapezoidal, or the like, etc.

In some other embodiments, the height and/or interval of the bumps or bosses can be kept at a fixed value, which are regularly and uniformly arranged, on the surface of the solder preform. Alternatively, different heights and/or interval values may be selected at the same time, which are irregularly and non-uniformly distributed on the surface of the solder preform.

In some other embodiments, the solder preform may also select any one of lead-based, indium-based, bismuth-based, zinc-based, antimony-based, silver-based, copper-based, aluminum-based solder, etc., as the solder preform made of an alloy material, or the solder preform made of alloy materials of any two or more of tin-based, lead-based, indium-based, bismuth-based, zinc-based, antimony-based, silver-based, copper-based, aluminum-based solder, etc., at any ratio of multilayer composites.

In some other embodiments, the internal structure of the solder preform may be a composite solder preform with a metal or non-metal mesh or wire attached inside the solder, or a composite solder preform with metal or non-metal particles contained in the solder matrix.

In some other embodiments, the solder preform may also be a kind of solder preform not coated with flux on the surface, or a solder preform containing flux in the solder matrix.

Embodiment 5

Figure 7:
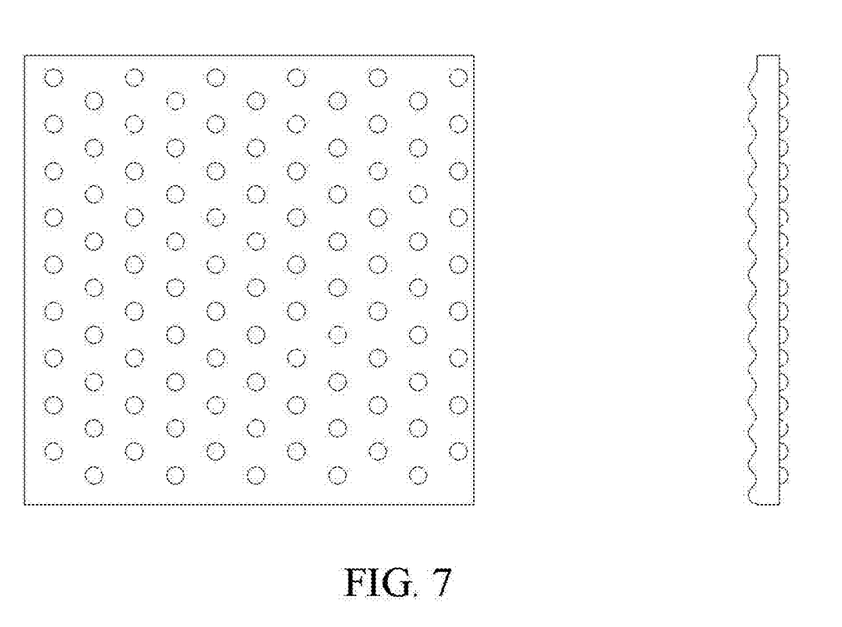
FIG. 7 is a schematic diagram of a solder preform containing double-surfaced protruding portions (different shapes of double-surfaced protruding portions), in which one surface is a convex edge and the other surface is a boss.

Referring to FIG. 7, FIG. 7 is a schematic diagram of a solder preform containing double-surfaced protruding portions (different shapes on both surfaces), in which one surface contains convex edges and the other surface contains bumps.

The solder preform in this embodiment can be understood as a combination of the solder preform's surface in Embodiment 1 (FIG. 3a) and the solder preform's surface in Embodiment 2 (FIG. 4).

The solder preform in this embodiment is formed by rolling or punching tin-based and copper-based alloy materials at a ratio of 6:1 of multilayer composite.

The solder preform is a solder preform coated with flux on the surface.

In some other embodiments, the solder preform may also select any one of tin-based, lead-based, indium-based, bismuth-based, zinc-based, antimony-based, silver-based, copper-based, aluminum-based solder, etc., as the solder preform made of an alloy material, or the solder preform made of alloy materials of any two or more of tin-based, lead-based, indium-based, bismuth-based, zinc-based, antimony-based, silver-based, copper-based, aluminum-based solder, etc., at any ratio of multilayer composites.

In some other embodiments, the internal structure of the solder preform may be a composite solder preform with a metal or non-metal mesh or wire attached inside the solder, or a composite solder preform with metal or non-metal particles contained in the solder matrix.

In some other embodiments, the solder preform may also be a kind of solder preform not coated with flux on the surface, or a solder preform containing flux in the solder matrix.

Embodiment 6

Referring to FIG. 8, FIG. 8a FIG. 8b, FIG. 8c, FIG. 8d, and FIG. 8e are solder preforms containing protruding portions or recessing portions in different shape combinations on the surface.

Figure 8A:
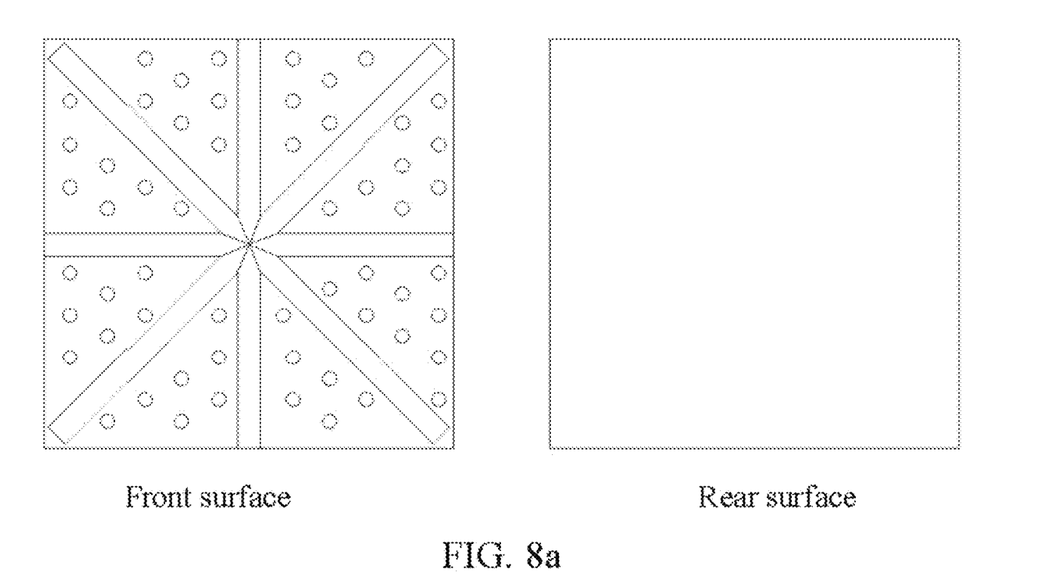
FIG. 8a is a schematic diagram of protruding portions or recessing portions containing different shape combinations in one surface, in which the protruding portions or recessing portions are arranged in a regular arrangement.

The solder preform of this embodiment is in a sheet shape as a whole, and the protruding portions of different shapes are a combination of ribs and bumps (or bosses), and are presented on one surface of the solder preform in a regular arrangement, which can be divided into several small cells with the same shape and arrangement (as shown in FIG. 8a). The distance between the highest point and the lowest point is 0.05 mm.

The alloy material of the solder preform is tin-based solder.

The solder preform is a solder preform coated with flux on the surface.

The overall shape of the solder preform can be made into square, round, arc-shaped, ring-shaped, frame-shaped or strip-shaped, etc.

In some other embodiments, the combination of protruding portions of different shapes as in FIG. 8a can also be replaced by a combination of recessing portions (pits or grooves) of different shapes, or can be, replaced by a combination of protruding portions (ribs, bumps or bosses) and recessing portions (pits or grooves) of different shapes.

Figure 8B:
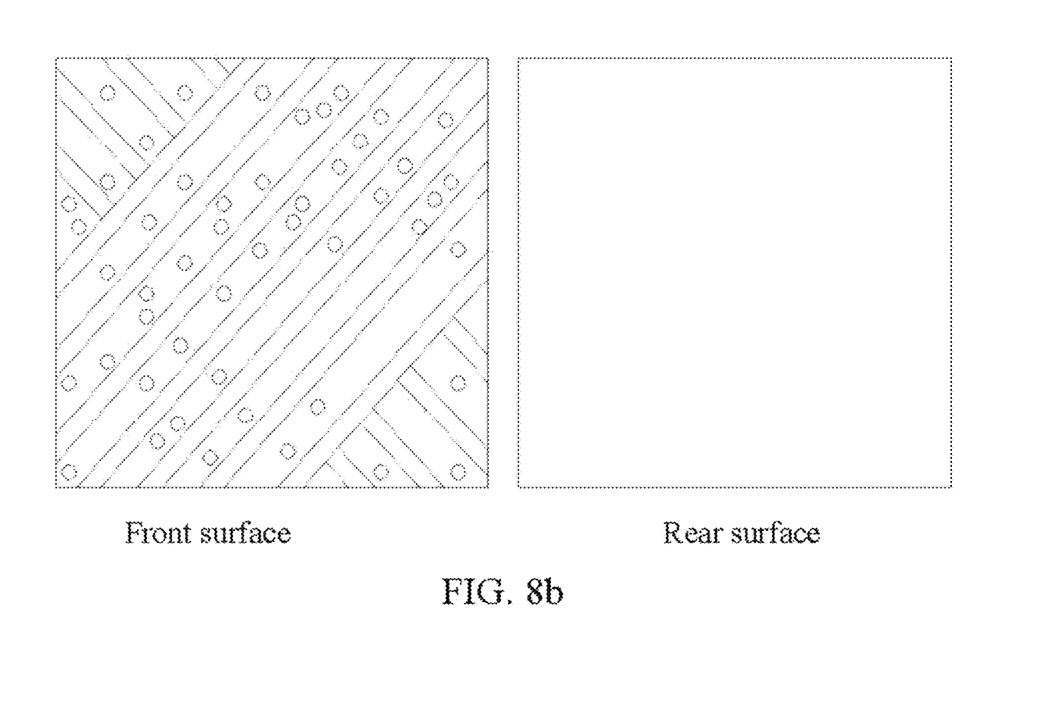
FIG. 8b is a schematic diagram of protruding portions or recessing portions containing different shape combinations in one surface, in which the protruding portions or recessing portions are provided in an irregular arrangement
Figure 8C:
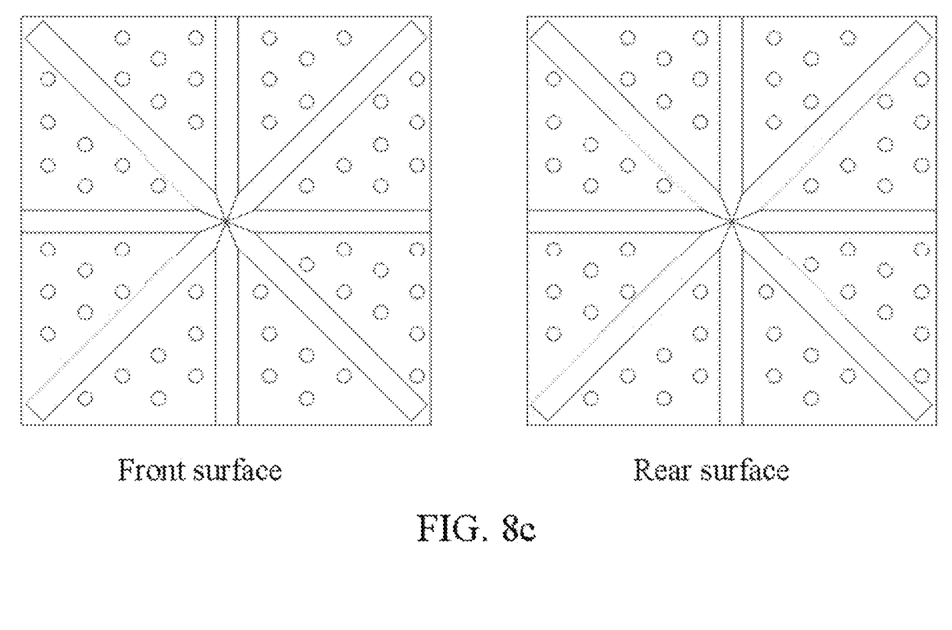
FIG. 8c is a schematic diagram of protruding portions or recessing portions containing different shape combinations in both surfaces, in which the protruding portions or recessing portions are arranged in a regular arrangement
Figure 8D:
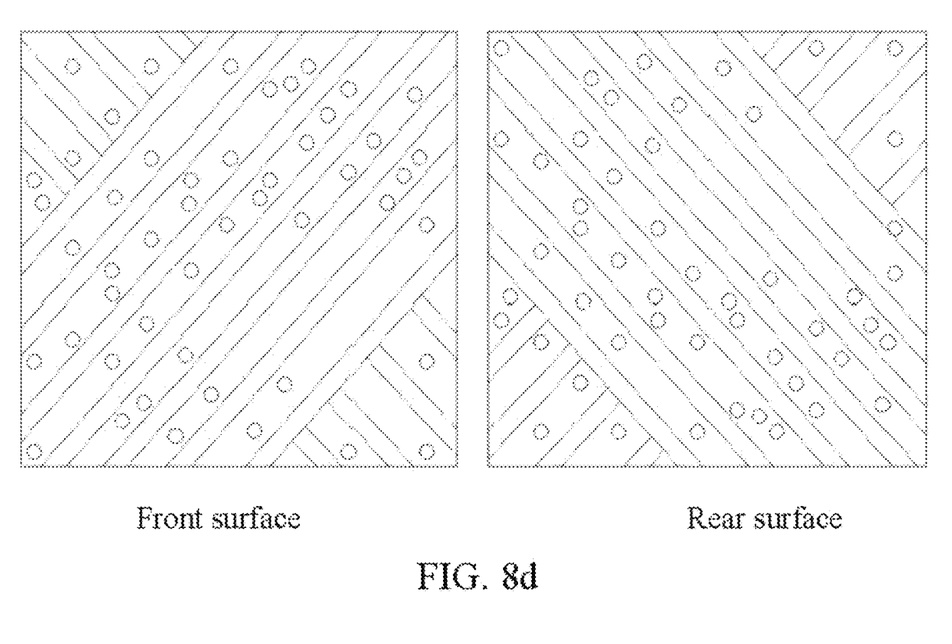
FIG. 8d is a schematic diagram of protruding portions or recessing portions containing different shape combinations in both surfaces, in which the protruding portions or recessing portions are provided in an irregular arrangement.
Figure 8E:
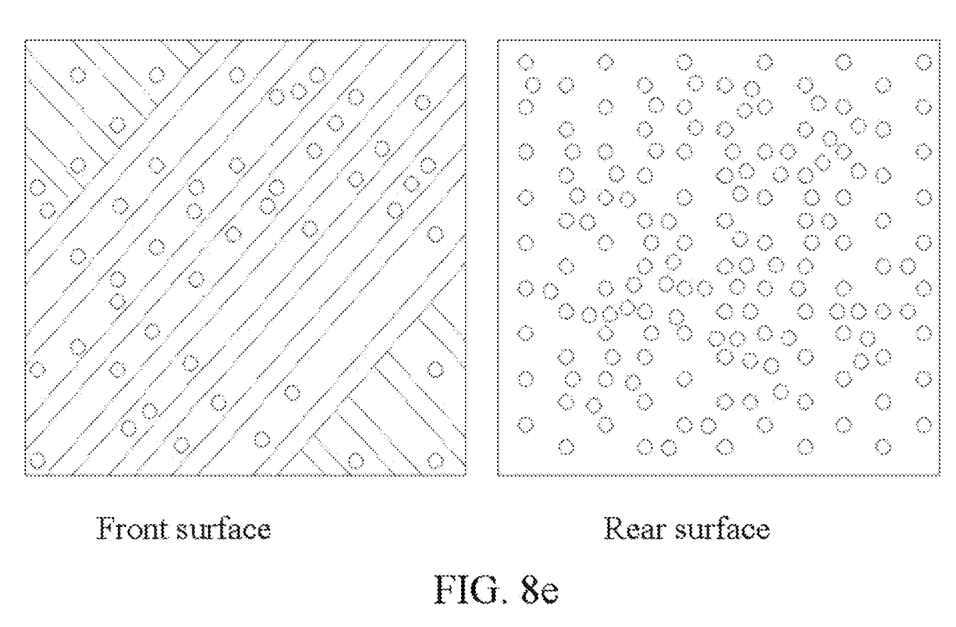
FIG. 8e is a schematic diagram of protruding portions or recessing portions containing different shape combinations in one surface and protruding portions or recessing portions containing the same shape in the other surface, in, which the protruding portions or recessing portions are provided in an irregular arrangement.

In some other embodiments, the protruding portions or recessing portions of different shape combinations can also be presented on one surface of the solder preform in an irregular arrangement (as shown in FIG. 8b); the protruding portions or recessing portions of different shape combinations can also be presented on both surfaces of the solder preform in a regular arrangement or in an irregular arrangement (as shown in FIGS. 8c and 8d); it may even be protruding portions or recessing portions containing different shape combinations in one surface and protruding portions or recessing portions containing the same shape in the other surface, in which the protruding portions or recessing portions are provided in an irregular arrangement (see FIG. 8e).

In some other embodiments, the height of the protruding portions and/or the depth and size of the recessing portions can be kept at a fixed value, or different heights of the protruding portions and/or the depths and sizes of the recessing portion may be selected at the same time.

In some other embodiments, the solder preform may also select any one of lead-based, indium-based, bismuth-based, zinc-based, antimony-based, silver-based, copper-based, aluminum-based solder, etc., as the solder preform made of an alloy material, or the solder preform made of alloy materials of any two or more of tin-based, lead-based, indium-based, bismuth-based, zinc-based, antimony-based, silver-based, copper-based, aluminum-based solder, etc., at any ratio of multilayer composites.

In some other embodiments, the internal structure of the solder preform may be a composite solder preform with a metal or non-metal mesh or wire attached inside the solder, or a composite solder preform with metal or non-metal particles contained in the solder matrix.

In some other embodiments, the solder preform may also be a solder preform not coated with flux on the surface, or a solder preform containing flux in the solder matrix.

In the above embodiments 1-6, the grooves, pits and protruding portions are provided with respect to each other. When there are protruding portions, the grooves or pits relative to the protruding portions are provided at the position where the protruding portions are not provided. For example, FIG. 3a, FIG. 5a, FIG. 7, etc. can be understood as a schematic diagram of protruding portions or a schematic diagram of grooves, so the drawings and related text descriptions will not be separately added here.

Experimental Example 1

The Test Experiment of the Void Rate of the Solder Preform of the Present Invention Test samples: Commercially available solder preforms with planar surfaces on both surfaces and solder preforms of Embodiment 1 of the present invention where one surface contains protruding portions and the other surface is planar.

Basic situation and experimental process of the sample:

Solder composition: Sn63Pb37 (referred to as 63/37)

Solder preform size: 38.5*31.5*0.20 mm (for the solder preform containing protruding portions on one surface, the same size conforms to the weight of the planar solder preform, ensuring that the thickness of the solder joint after soldering is the same, and the height of the protruding portion is 0.09 mm.)

The surface is coated with the same flux, and (the planar solder preform and, the solder preform with protruding portions on one surface) have a flux content of 1%.

Soldered material: An oxygen-free copper plate with a thickness of 2 mm

Soldering method: Two oxygen-free copper plates with a solder preform therebetween are subjected to reflow soldering.

A device for detecting void rate: Ultrasonic detector

There are 20 commercially available double-surfaced planar solder preforms and solder preforms of Embodiment 1 of the present invention, where one surface contains protruding portions, and the soldered materials are soldered by the above soldering method. An ultrasonic detector is then used to detect the void ratio of the products soldered by each solder preform, and the value of each group is recorded and the average value of each group is calculated. The results are shown in Table 1.

TABLE 1

Test results of Embodiment 1 and Comparative example

| No. (planar solder preform, comparative example) | Soldering void ratio (%) | No. (solder preform with protruding portions on one surface, Embodiment 1) | Soldering void ratio (%) |
| --- | --- | --- | --- |
| 1# | 12.62 | 21# | 4.56 |
| 2# | 11.43 | 22# | 4.48 |
| 3# | 10.87 | 23# | 3.93 |
| 4# | 11.85 | 24# | 4.43 |
| 5# | 12.78 | 25# | 4.57 |
| 6# | 9.56 | 26# | 4.61 |
| 7# | 10.76 | 27# | 4.82 |
| 8# | 11.23 | 28# | 5.04 |
| 9# | 10.39 | 29# | 4.58 |
| 10# | 15.83 | 30# | 3.86 |
| 11# | 13.42 | 31# | 4.63 |
| 12# | 10.32 | 32# | 4.72 |
| 13# | 12.09 | 33# | 4.92 |
| 14# | 11.59 | 34# | 4.84 |
| 15# | 13.12 | 35# | 4.66 |
| 16# | 11.39 | 36# | 4.17 |
| 17# | 11.76 | 37# | 5.22 |
| 18# | 10.36 | 38# | 4.90 |
| 19# | 10.98 | 39# | 4.59 |
| 20# | 12.36 | 40# | 4.85 |
| Average value | 11.74 | Average value | 4.62 |

From the comparison of the soldering void rate data, it can be clearly seen that the void of the solder preform of the present invention is significantly less than that of the planar solder preform of the prior art.

Experimental Example 2

The Test Experiment of the Void Rate of the Solder Preform of the Present Invention Test samples: Commercially available solder preforms with planar surfaces on both surfaces and solder preforms provided with bumps (protruding portions) on both surfaces of Embodiment 4 of the present invention.

Basic situation and experimental process of the sample:

Solder composition: Sn96.5Ag3Cu0.5 (referred to as SAC305)

Solder preform size: 38.5*31.5*0.25 mm (for the solder preform provided with bumps on both surfaces, the same size conforms to the weight of the planar solder preform, ensuring that the thickness of the solder joint after soldering is the same, and the height of the bumps on both surfaces is 0.07 mm.)

The surface is coated with the same flux, and (the planar solder preform and the solder preform provided with bumps on both surfaces) have a flux content of 2%.

Soldered material: An oxygen-free copper plate with a thickness of 2 mm

Soldering method: Two oxygen-free copper plates with a solder preform therebetween are subjected to reflow soldering.

A device for detecting void rate: Ultrasonic detector

There are 20 commercially available double-surfaced planar solder preforms and solder preforms provided with bumps on both surfaces of Embodiment 4 of the present invention, and the soldered materials are soldered by the above soldering method. An ultrasonic detector is then used to detect the void ratio of the products soldered by each solder preform, and the value of each group is recorded and the average value of each group is calculated. The results are shown in Table 2.

TABLE 2

Test results of Embodiment 4 and Comparative example

| No. (planar solder preform, comparative example) | Soldering void ratio (%) | No. (solder preform with bumps on both surfaces, Embodiment 4) | Soldering void ratio (%) |
| --- | --- | --- | --- |
| 1# | 7.50 | 21# | 2.40 |
| 2# | 7.54 | 22# | 2.34 |
| 3# | 7.10 | 23# | 3.01 |
| 4# | 7.43 | 24# | 3.53 |
| 5# | 9.78 | 25# | 3.62 |
| 6# | 9.56 | 26# | 3.55 |
| 7# | 10.57 | 27# | 2.66 |
| 8# | 10.60 | 28# | 2.88 |
| 9# | 7.22 | 29# | 2.21 |
| 10# | 8.25 | 30# | 2.44 |
| 11# | 8.04 | 31# | 2.74 |
| 12# | 8.66 | 32# | 2.55 |
| 13# | 13.06 | 33# | 2.96 |
| 14# | 12.61 | 34# | 3.16 |
| 15# | 9.86 | 35# | 2.59 |
| 16# | 9.93 | 36# | 2.63 |
| 17# | 11.52 | 37# | 3.22 |
| 18# | 11.86 | 38# | 2.78 |
| 19# | 9.32 | 39# | 3.02 |
| 20# | 9.64 | 40# | 2.73 |
| Average value | 9.50 | Average value | 2.85 |

From the comparison of the soldering void rate data, it can be clearly seen that the void of the solder preform of the present invention is significantly less than that of the planar solder preform of the prior art.

Experimental Example 3

The Test Experiment of the Void Rate of the Solder Preform of the Present Invention Test samples: Commercially available solder preforms with planar surfaces on both surfaces and solder preforms provided with protruding portions on both surfaces of Embodiment 6 of the present invention (as shown in FIG. 8e).

Basic situation and experimental process of the sample:

Solder composition: Sn95Sb5

Solder preform size: 38.5*31.5*0.15 mm (for the solder preform provided with protruding portions on both surfaces as shown in FIG. 8e, the same size conforms to the weight of the planar solder preform, ensuring that the thickness of the solder joint after soldering is the same, the height of the front protruding portion, is 0.04 mm, and the height of the rear protruding portion is 0.05 mm.)

The surface is coated with the same flux, and (the planar solder preform and the solder preform provided with protruding portions on both surfaces) have a flux content of 0.5%.

Soldered material: An oxygen-free copper plate with a thickness of 2 mm

Soldering method: Two oxygen-free copper plates with a solder preform there between are subjected to reflow soldering.

A device for detecting void rate: Ultrasonic detector

There are 20 commercially available double-surfaced planar solder preforms and solder preforms provided with protruding portions on both surfaces as shown in FIG. 8e of Embodiment 6 of the present invention, and the soldered materials are soldered by the above soldering method. An ultrasonic detector is then used to detect the void ratio of the products soldered by each solder preform, and the value of each group is recorded and the average value of each group is calculated. The results are shown in Table 3.

TABLE 3

Test results of Embodiment 6 and Comparative example

| No. (planar solder preform, comparative example) | Soldering void ratio (%) | No. (solder preform with protruding portions on both surfaces, Embodiment 6) | Soldering void ratio (%) |
| --- | --- | --- | --- |
| 1# | 14.63 | 21# | 6.92 |
| 2# | 16.02 | 22# | 6.58 |
| 3# | 16.83 | 23# | 6.32 |
| 4# | 15.27 | 24# | 5.97 |
| 5# | 14.23 | 25# | 7.39 |
| 6# | 15.56 | 26# | 7.73 |
| 7# | 14.43 | 27# | 8.06 |
| 8# | 16.29 | 28# | 7.56 |
| 9# | 15.89 | 29# | 8.35 |
| 10# | 15.71 | 30# | 8.61 |
| 11# | 14.48 | 31# | 8.19 |
| 12# | 16.33 | 32# | 7.44 |
| 13# | 14.58 | 33# | 8.55 |
| 14# | 15.43 | 34# | 7.89 |
| 15# | 15.92 | 35# | 9.46 |
| 16# | 14.43 | 36# | 7.94 |
| 17# | 15.74 | 37# | 7.58 |
| 18# | 13.35 | 38# | 8.62 |

TABLE 3-continued

Test results of Embodiment 6 and Comparative example

| No. (planar solder preform, comparative example) | Soldering void ratio (%) | No. (solder preform with protruding portions on both surfaces, Embodiment 6) | Soldering void ratio (%) |
| --- | --- | --- | --- |
| 19# | 15.52 | 39# | 7.92 |
| 20# | 15.86 | 40# | 6.88 |
| Average value | 15.33 | Average value | 7.70 |

From the comparison of the soldering void rate data, it can be clearly seen that the void of the solder preform of the present invention is significantly less than that of the planar solder preform of the prior art.

The above embodiments only express several implementations of the present invention, and their descriptions are more specific and detailed, but they should not be construed as limiting the patent scope of the present invention. It should be noted that, for those skilled in the art, a number of modifications and improvements can be made without departing from the concept of the present invention, all of which fall within the protection scope of the present invention. Therefore, the patent protection scope of the present invention shall be subject to the appended claims.

What is claimed is:

1. A solder preform, wherein two opposite surfaces of the solder preform are provided with a plurality of protruding portions and/or recessing portions provided at intervals, respectively;
the solder preform is a solder preform containing flux, the flux exists on the solder preform is surface coating;
a distance between a highest point and a lowest point on the two opposite surfaces of the solder preform is 0.005-0.2 mm.

2. The solder preform according to claim 1, wherein the interval is: 0.1-100 mm.

3. The solder preform according to claim 1, wherein the protruding portions comprise ribs, bumps or bosses.

4. The solder preform according to claim 1, wherein the recessing portions comprise grooves or pits.

5. The solder preform according to claim 1, wherein the solder preform is at least one of tin-based, lead-based, indium-based, bismuth-based, zinc-based, antimony-based, silver-based, copper-based, aluminum-based alloys.

6. The solder preform according to claim 1, wherein the cross-sectional shape of the protruding portion or the recessing portion on the surface of the solder preform is, square, rectangular, trapezoidal, triangular, U-shaped or fan-shaped.

7. The solder preform according to claim 1, wherein the solder preform is a composite solder preform with a metal or non-metal mesh or wire attached inside the solder, or, is a composite solder preform with metal or non-metal particles contained in the solder matrix.

8. The solder preform according to claim 1, wherein the overall shape of the solder preform is square, round, arc-shaped, ring-shaped, frame-shaped or strip-shaped.

* * * * *